May 31, 1932.  R. K. STRATFORD  1,860,823

PROCESS FOR TREATING LUBRICATING OILS WITH PHENOL

Filed Oct. 29, 1929

Reginald K. Stratford
INVENTOR

BY
ATTORNEY

Patented May 31, 1932

1,860,823

UNITED STATES PATENT OFFICE

REGINALD K. STRATFORD, OF SARNIA, ONTARIO, CANADA, ASSIGNOR TO STANDARD OIL DEVELOPMENT COMPANY, A CORPORATION OF DELAWARE

PROCESS FOR TREATING LUBRICATING OILS WITH PHENOL

Application filed October 29, 1929. Serial No. 403,182.

The present invention relates to an improved process for the purification of lubricating oils by means of a selective solvent and more specifically comprises a method for treating lubricating oils with anhydrous phenol to remove undesirable constituents from the oil.

Figure 1:
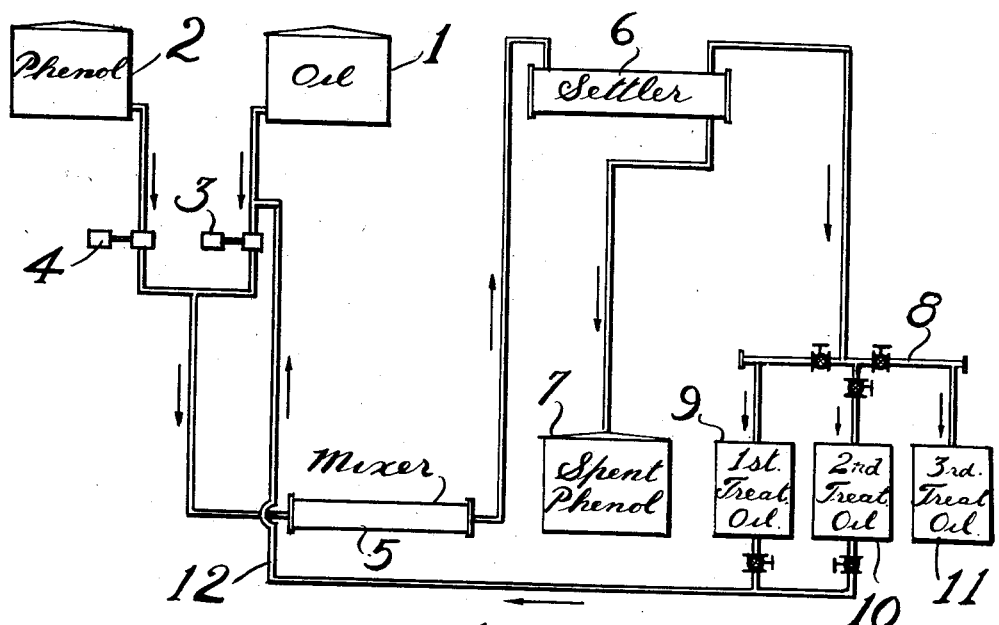
Figure 2:
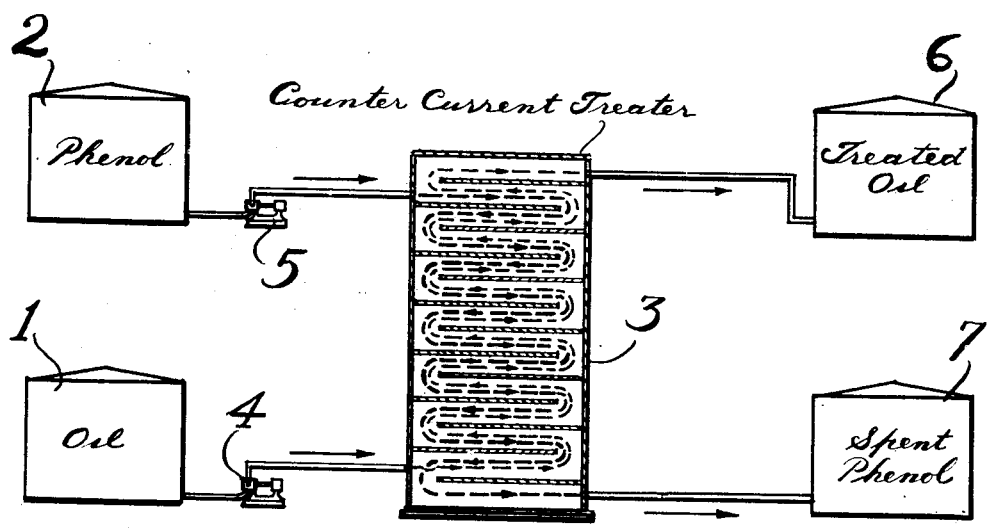

The invention will be fully understood from the following description in conjunction with the drawings, in which Fig. 1 shows a batch treater, and
Fig. 2 a counter-current treater.

Both figures represent a diagrammatic elevation of the apparatus shown with parts in section.

It has already been proposed to treat hydrocarbon oils with phenol containing 5–15 per cent of water to remove a large percentage of the unsaturated and aromatic hydrocarbons. It has also been proposed to purify oils with a mixture of phenol and an organic solvent such as acetone, acetic acid, pyridin.

I have discovered that lubricating oils can be purified by treatment with anhydrous phenol while keeping the treating temperature below that at which the treating agent becomes completely miscible with the treated oil.

The treating consists in agitating the lubricating oil with the liquid phenol, settling and separating the purified oil layer from the phenol layer containing the absorbed constituents. It may be carried out either as a batch operation or as a semi-continuous or continuous operation in any appropriate apparatus. The batch and the counter-current treater of the drawings are only shown by way of illustration.

In Fig. 1 the oil and phenol from storage tanks 1 and 2 are passed by means of pumps 3 and 4 respectively through a mixer 5 into a settler 6. From the latter the spent phenol flows into tank 7 and the treated oil flows through manifold 8 into run-down tank 9. From the latter the oil is returned through line 12 to the treating cycle, passing the twice treated oil into tank 10. The oil from tank 10 may be again returned to the treating cycle and the three times treated oil passed into run-down tank 11. If necessary, more than three run-down tanks can be provided for.

In Fig. 2 the oil from tank 1 and the phenol from tank 2 are passed through the counter-current treater 3 by means of pumps 4 and 5 respectively. In the treater, which may consist of several compartments, the oil and the phenol are passed through the compartments, as indicated by arrows, according to the principle of counter-current treatment. The treated oil then is stored in tank 6 and the spent phenol in tank 7.

The oil may be agitated with the phenol in the batch treater for a certain length of time, for example half an hour and allowed to settle for approximately the same length of time. The time of agitating and settling will depend on the treating temperature and the viscosity of the oil treated, lower temperatures and higher viscosities making a longer treating time necessary. The oil may be given several batch treats in succession.

In the counter-current treatment the phenol containing the absorbed constituents is gradually brought in contact with oil which obtained less partial treats. The time required for agitating and settling in each treater is shorter than in the case of a batch operation.

The amount of phenol used in one batch or one counter-current treat may vary within considerable limits, say from 50% to 300%. In many cases the proportion of 100 lbs. of phenol to 100 lbs. of oil in a counter-current treater was found to be advantageous.

The treated oil usually contains 5–20% of phenol which can be separated from the oil by distillation. Similarly the phenol may be separated from the mixture of phenol and extracted constituents by distilling off the phenol from the extract. Other methods of separation may be used such as treating with hot lye etc., although separation by distilling off the phenol is preferentially used since it can be carried out with good efficiency.

In the following table there are summarized the experimental conditions and the results obtained together with yield and test data of the raffinate for a number of treating runs carried out according to the present invention.

Table

Stock treated: Heavy Colombian vacuum distillate;
Gravity 20.6° A. P. I.,
Viscosity @ 210° F., $v_1$=91 seconds,
Viscosity @ 100° F., $v_2$=1900 seconds, $$\frac{100\ v_1}{v_2} = 4.8$$

Sulfur 0.83%

| Number of treats | % phenol used | Temp. of treat ° F. | Phenol in oil % | Raffinate ||||| Sulfur % |
|---|---|---|---|---|---|---|---|---|---|
| | | | | Yield % | Gravity ° A. P. I. | $v_1$ Visc. @ 210° F. | $v_2$ Visc. @ 100° F. | $\frac{100\ v_1}{v_2}$ | |
| BATCH TREAT |||||||||| |
| 1 | 100 | 120 | 13  | 80 | 23.0 | 81 | 1240 | 6.5  | 0.58 |
| 2 | 100 | 120 | 9.9 | 64 | 25.3 | 75 | 970  | 7.7  | 0.38 |
| 3 | 100 | 120 | 8.0 | 57 | 26.0 | 72 | 812  | 8.9  | 0.23 |
| 4 | 100 | 120 | 7.1 | 50 | 27.6 | 71 | 770  | 9.2  | 0.20 |
| 3 | 100 | 180 | 11.8| 33 | 27.8 | 72 | 717  | 10.0 | 0.24 |
| COUNTER-CURRENT TREAT IN A 7 COMPARTMENT UNIT |||||||||| |
| 1 | 100 | 140 | 11.0 | 66 | 25.3 | 75 | 925 | 8.1  | 0.34 |
| 1 | 150 | 140 | 10.6 | 62 | 26.4 | 73 | 837 | 8.7  | 0.29 |
| 1 | 150 | 180 | 13.4 | 37 | 27.7 | 70 | 684 | 10.2 | 0.18 |
| 1 | 100 | 160 | 15.4 | 49 | 26.6 | 73 | 826 | 8.8  | 0.28 |

The above table shows that the phenol treatment lowers the viscosity of lubricating oils. It is characteristic that the viscosity at 100° F. is lowered in a larger proportion than the viscosity at 210° F. so that the ratio of the viscosity at 210° F. to the viscosity at 100° F. is always increased by the treatment. Since a high value of this ratio is a characteristic of good lubricating oils such as Pennsylvania lubricants, it follows immediately that the phenol treatment improves the lubricating quality of oil. The gravity of the oil is similarly increased which again is an indication of better lubricating oil. A further improvement is to be noticed in a considerable reduction of sulfur content. In general it may be said that low-grade lubricating oils are transformed by the method of the present invention into Pennsylvania grade lubricants or at least they are improved in that direction.

A comparison of the batch and counter-current treats shows that the latter is preferable since it reduces the quantity of phenol to one half that required for batch treating and also improves the yield of raffinate 4 to 8% approximately.

A very important factor for the success of the treatment is the selection of the right temperature. The latter, of course, should be kept safely above the melting point of the phenol which is 105.8° F., but should not exceed a certain critical temperature at which the phenol becomes completely miscible with the oil. This temperature cannot be stated in degrees since it varies with the stock treated and also with the percentage of the phenol used. For instance when using 100% concentrated phenol in the counter-current treatment of heavy Colombian vacuum distillate the miscibility point was reached at 140° F. with 50% phenol and at 180° F. with 100% phenol as compared to the amount of oil treated. The best way to determine the miscibility point is by experiment. As a rule this temperature is below 250° F.

The treating temperature has a great influence on the raffinate yield and on the improvement obtained. Higher treating temperatures cause a greater improvement in the lubricating quality, elimination of sulfur content, etc., but at the same time reduce the yield of raffinate. The optimum temperature of treating most lubricating oils with 100-150% of phenol is between 130°-140° F., but where it is necessary to obtain a great improvement from oils like Colombian distillate, temperatures up to 180° F. can be used.

The main advantage of using pure phenol for the treatment of lubricating oils is that the quantity of phenol necessary for a given improvement is reduced by ⅓ to ½ of that which is required in treating with mixtures of phenol and water, or phenol and an organic diluent. Furthermore, greater improvements can be obtained with pure phenol than when using diluents.

In the following claims the expression "undiluted phenol" is used to mean a phenol which has not been diluted with water, or organic solvents such as acetic acid, acetone, etc. Such phenol, however, may contain extract removed from the oil in a prior treating step. The presence of difficulty removable traces of water or other diluent does not make "anhydrous" or "undiluted" phenol unsuitable for the purposes of this invention.

Having thus described my invention and the way of carrying it out what I claim is:

1. The process of treating hydrocarbon lubricating oils, which comprises agitating the oil with undiluted liquid phenol below the temperature at which the phenol becomes completely miscible with the oil, and separating the oil layer from the phenol layer.

2. The process according to claim 1 in which the treating is carried out at a temperature not exceeding 250° F.

3. The process according to claim 1 in which the treating is carried out at a temperature not exceeding 180° F.

4. The process according to claim 1 in which the treating is carried out at a temperature not exceeding 140° F.

5. The process according to claim 1 in which the oil is treated with an approximately equal amount by weight of phenol.

6. The process according to claim 1 in which the treatment is carried out in a substantially counter-current manner.

7. The process of treating hydrocarbon lubricating oils, which comprises agitating the oil with approximately 100–150% of undiluted liquid phenol at a temperature not above 140° F. in one of a series of agitators, separating an oil layer and a phenol layer, and transferring the phenol layer into the next agitator wherein it comes in contact with another oil layer according to the counter-current principle, and removing oil layer and phenol layer from said series.

REGINALD K. STRATFORD.